UNITED STATES PATENT OFFICE.

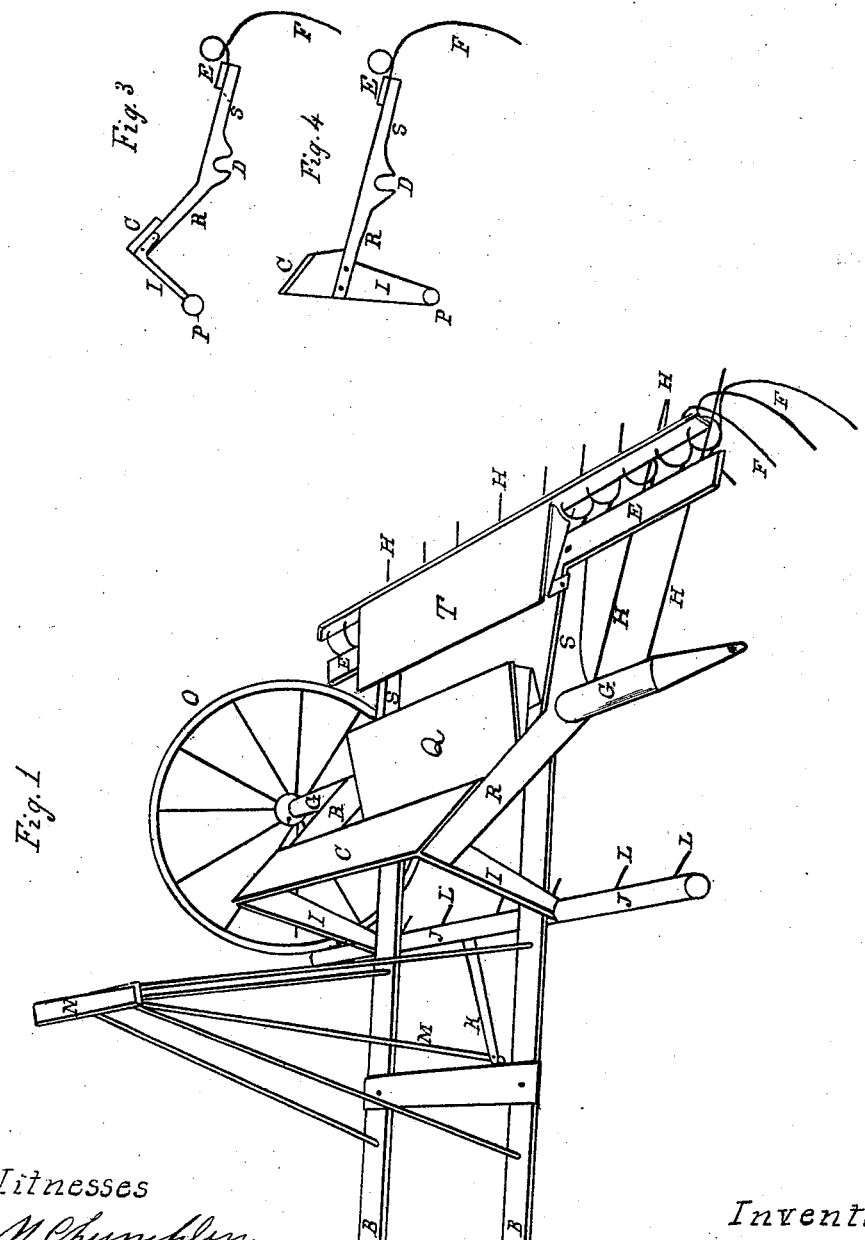

ASAHEL COWLEY, OF HARPERSFIELD, NEW YORK.

IMPROVEMENT IN HORSE HAY-RAKES.

Specification forming part of Letters Patent No. 19,753, dated March 30, 1858.

*To all whom it may concern:*

Be it known that I, ASAHEL COWLEY, of the town of Harpersfield, in the county of Delaware and State of New York, have invented a new and useful Improvement on the Spring-Tooth Horse - Rake; and I do hereby declare that the following is a full, clear, and exact description of the construction and operation of the same, reference being had to the annexed drawings, making a part of this specification, in which—

Figure 1 is a perspective view of a rake with my improvement, one wheel being taken off that the improvement may be seen more plainly. Figs. 3 and 4 show two of the different forms in which the crooked levers may be made, and also two different forms of the shanks which extend from the levers to the head of the separator, the letters of reference referring to the different parts as follows:

B B are thills; C, board forming forward division of platform; D, slanting notch in levers; E E, head of rake; F F, teeth of the same; G G, axle serving as fulcrum to levers; H H, discharging-rods; I I, shanks connecting straps around head of separator with levers; J J, head of separator; K, arm extending from separator to vibrator; L L, teeth of separator; M, vibrator; N, hand-rest; O, wheel; P, strap surrounding head of separator; Q, middle division of platform; R R, forward arms of levers; S S, hind arms of levers; T, hindmost division of platform.

To describe my improvement particularly, I divide it into three parts.

One object of the first part of my improvement is to enable such as already have a common spring-tooth rake to avail themselves of the advantages of a wheel-rake without incurring the expense of one wholly new. To effect this I take off from the common rake the handles and thills, and in place of the thills, though at a greater distance from its center, I attach to the head of the rake E E two crooked levers, R S R S, Fig. 1, which levers I connect at their forward ends by a board, C, extending from one to the other, and being securely fastened to the top of each. This board, when the rake is used, forms the fore part of the platform on which the laborer who uses it stands. The levers are mounted on a sort of cart easily made by putting a long axle and thills to two wheels of a one-horse wagon, the axle G G serving as a fulcrum to the levers, a slanting notch, D, being made in them where they rest on the axle, the axle also at that place being rounded to receive and permit them to turn freely on their fulcrum. The forward part of the platform C, as already stated, is attached to the forward arms of the levers R R, and of course rises and falls with them. The back part of the platform T is attached to the other arms of the levers S S and partakes of their motion; but the middle part of the platform Q is entirely unconnected with the levers, and being securely fastened to the axle, it remains when the rake is used in nearly a horizontal position.

Another object of the first part of my improvement is to make a rake in such a form that the second and third parts of said improvement can be added to it.

The object of the second part of my improvement is to prevent the teeth from raising the hay when the rake discharges its load—a difficulty which frequently occurs with the common rake. To accomplish this I use what (for want of a better name) I call "discharging-rods" H H. One end of these rods is inserted into the back side of the axle, and they extend backward under and near the head of the rake, and between the teeth, so that the hay is by them kept down when the teeth rise and pass over it.

The object of the third part of my improvement is, when the hay lies thick on the ground, to enable the teeth to pass easily through it without dragging it along and scattering it behind the rake. To effect this object I use what I call a "separator," which consists of a head or tumbling-shaft, J J, and short teeth L L. The teeth may be made of large wire, and, if the land to be raked is not quite smooth, they should be coiled, but not closely, either once or twice around the head, so that when they strike any obstruction they may spring back and pass over it. I connect the separator with the forward ends of the levers by shanks I I, extending downward to iron straps or rings P, which surround the head of the separator, though not so closely as to prevent its rolling backward and forward in them. From the head of the separator an arm, K, extends forward to the lower end of a vibrator, M, with which it is connected by a joint or pivot, the upper end of the vibrator being also, by means of a hinge or pivot, connected with the hand-rest N. By this arrangement, when the separator descends the points of its teeth are thrown forward, and when it rises they are thrown back, so as to pass over the hay without difficulty. When the hay is quite thin the separator is unnecessary, and where the ground is very rough or uneven the rake will work better without it. I therefore fasten the shanks to the levers by means of screw-bolts, so that they can be taken off readily.

The levers, platform, and head of the separator may be made of wood. The discharging-rods, arm, vibrator, and shanks between the separator and levers may be either wood or iron. The parts necessary to be fastened together can be fastened by rivets, or, what is much better, iron screw-bolts.

To use the rake, I stand on the middle division of the platform and drive the horse by which it is drawn. If necessary, I put one foot on the hind division and bear on it with as much of my weight as is requisite. To unload the rake, I put one foot on the forward division of the platform and press it suddenly down till it rests on the thills, where I keep it till the load is discharged, the separator in the meantime having separated the hay in front of the windrow, so that the rake-teeth can fall to the ground without obstruction. The same process is then repeated.

What I claim as my invention, and desire to secure by Letters Patent, is—

The within-described combination of a separator with a wheel-rake, the whole being constructed, arranged, and operated in the manner and for the purpose as set forth.

ASAHEL COWLEY.

Witnesses:
C. R. N. CHAMPLIN,
J. F. COWLES.